(12) United States Patent
Neubauer et al.

(10) Patent No.: US 7,746,958 B2
(45) Date of Patent: Jun. 29, 2010

(54) RECEIVER FOR A WIRE-FREE COMMUNICATION SYSTEM

(75) Inventors: André Neubauer, Krefeld (DE); Markus Hammes, Dinslaken (DE); Dieter Brückmann, Meerbusch (DE)

(73) Assignee: Infineon Technologies AG, Munich (DE)

( * ) Notice: Subject to any disclaimer, the term of this patent is extended or adjusted under 35 U.S.C. 154(b) by 1183 days.

(21) Appl. No.: 11/152,319

(22) Filed: Jun. 14, 2005

(65) Prior Publication Data
US 2006/0002490 A1 Jan. 5, 2006

(30) Foreign Application Priority Data
Jun. 15, 2004 (DE) .................. 10 2004 028 806

(51) Int. Cl.
H04L 27/06 (2006.01)
(52) U.S. Cl. ...................... 375/316; 375/324
(58) Field of Classification Search ............... 375/316, 375/322, 324, 334; 455/131
See application file for complete search history.

(56) References Cited

U.S. PATENT DOCUMENTS

| | | | | |
|---|---|---|---|---|
| 5,168,526 A * | 12/1992 | Orban | ............... | 381/94.8 |
| 5,241,561 A * | 8/1993 | Barnard | ............... | 375/147 |
| 5,422,909 A * | 6/1995 | Love et al. | ............... | 375/147 |
| 5,610,942 A * | 3/1997 | Chen et al. | ............... | 375/242 |
| 5,818,544 A * | 10/1998 | Han | ............... | 348/725 |
| 5,825,807 A * | 10/1998 | Kumar | ............... | 375/130 |
| 5,896,419 A * | 4/1999 | Suzuki | ............... | 375/219 |
| 5,946,292 A * | 8/1999 | Tsujishita et al. | ............... | 370/204 |
| 6,047,019 A * | 4/2000 | Ishii | ............... | 375/148 |
| 6,463,295 B1 * | 10/2002 | Yun | ............... | 455/522 |
| 6,546,055 B1 * | 4/2003 | Schmidl et al. | ............... | 375/244 |
| 6,654,340 B1 * | 11/2003 | Jones et al. | ............... | 370/208 |
| 6,690,949 B1 * | 2/2004 | Shamlou et al. | ............... | 455/557 |

(Continued)

FOREIGN PATENT DOCUMENTS

DE 101 03 479 A1 8/2002

OTHER PUBLICATIONS

"Frequenzmodulation" by Eugen-Georg Woschni, Theorie und Technik, 1960, Berlin, VEB Verlag Berlin, pp. 108-139.

(Continued)

*Primary Examiner*—Temesghen Ghebretinsae
(74) *Attorney, Agent, or Firm*—Eschweiler & Associates, LLC

(57) ABSTRACT

The present invention is directed to a receiver for a wire-free communication system for reception of a received signal which is modulated using a digital modulation method having a first frequency conversion device for production of a frequency-converted received signal by conversion of the received signal to an intermediate frequency. The receiver further includes a pre-filter for production of a filtered received signal from the frequency-converted received signal such that the received signal is band-limited, and an analogue/digital converter for production of a binary received signal from the filtered received signal by comparison of the filtered received signal with a level threshold. In addition, the receiver includes a phase reconstruction device for production of a phase-reconstructed received signal by reproduction of the phase of the received signal from the time intervals between zero crossings of the binary received signal, and a mapping device for production of a bit sequence by mapping symbols from the phase-reconstructed received signal onto this bit sequence using the digital modulation method.

15 Claims, 3 Drawing Sheets

U.S. PATENT DOCUMENTS

| | | | |
|---|---|---|---|
| 6,774,829 B2* | 8/2004 | Nakada et al. | 341/126 |
| 6,922,555 B1* | 7/2005 | Mohindra | 455/314 |
| 6,999,527 B2* | 2/2006 | Chen | 375/324 |
| 7,016,425 B1* | 3/2006 | Kraiem | 375/261 |
| 7,035,661 B1* | 4/2006 | Yun | 455/522 |
| 7,239,855 B2* | 7/2007 | Matsui et al. | 455/127.1 |
| 7,302,241 B2* | 11/2007 | Koenig | 455/136 |
| 7,453,792 B2* | 11/2008 | Chadha et al. | 370/203 |
| 2001/0043583 A1* | 11/2001 | Sakoda et al. | 370/337 |
| 2002/0030877 A1* | 3/2002 | Way et al. | 359/183 |
| 2002/0097819 A1* | 7/2002 | Chen | 375/343 |
| 2003/0016622 A1* | 1/2003 | McCarty, Jr. | 370/207 |
| 2003/0031274 A1* | 2/2003 | Chen | 375/324 |
| 2003/0043769 A1* | 3/2003 | Dolman et al. | 370/337 |
| 2003/0067997 A1* | 4/2003 | Kintis et al. | 375/329 |
| 2003/0156063 A1* | 8/2003 | Spilker et al. | 342/464 |
| 2004/0037366 A1* | 2/2004 | Crawford | 375/295 |
| 2005/0079837 A1* | 4/2005 | Koenig | 455/136 |
| 2005/0118963 A1* | 6/2005 | Chiu | 455/115.1 |
| 2005/0168370 A1* | 8/2005 | Mokhtari et al. | 341/158 |
| 2005/0175116 A1* | 8/2005 | Feher | 375/267 |
| 2005/0185699 A1* | 8/2005 | Feher | 375/146 |
| 2005/0185743 A1* | 8/2005 | Li | 375/350 |
| 2005/0239398 A1* | 10/2005 | Lai | 455/3.02 |
| 2005/0243952 A1* | 11/2005 | Li | 375/343 |
| 2005/0259768 A1* | 11/2005 | Yang et al. | 375/345 |
| 2005/0265485 A1* | 12/2005 | Robinson | 375/322 |
| 2006/0014506 A1* | 1/2006 | Haartsen | 455/227 |
| 2008/0189104 A1* | 8/2008 | Zong et al. | 704/226 |

OTHER PUBLICATIONS

"Nachrichtenübertragung" by Karl Dirk, Nachrichtenüber tragung, 1992, Stuttgart, Teubner Verlag, pp. 348-355.

* cited by examiner

RECEIVER FOR A WIRE-FREE COMMUNICATION SYSTEM

REFERENCE TO RELATED APPLICATIONS

This application claims the benefit of the priority date of German application DE 10 2004 028 806.2, filed on Jun. 15, 2004, the contents of which are herein incorporated by reference in their entirety.

FIELD OF THE INVENTION

The present invention relates in general to wire-free communication systems, and in particular to a receiver for a wire-free communication system for reception of a received signal which is modulated using a digital modulation method.

BACKGROUND OF THE INVENTION

A wire-free digital communication system has at least one transmitter and one receiver. The information to be transmitted from a transmitter is normally initially in the form of a bit sequence. The bit sequence is mapped in the transmitter onto symbols on a complex plane, by means of a mapping device or a mapper. The complex plane is covered by a real in-phase branch (I) and an imaginary quadrature branch (Q), and the symbols correspondingly have an in-phase component and a quadrature component. The complex plane is also referred to as the symbol space, state diagram or constellation diagram. The symbols are thus also referred to as states or constellation points. The mapping rule that is used in the mapping device differs depending on the digital modulation method that is used. In general, k bits can be combined to form a symbol with $M=2^k$ states. The number of states also governs the value of a digital modulation method, that is to say the number of distinguishable values or symbols which a digital modulation method has.

After the mapping device, the symbols are filtered by means of a transmission filter in the transmitter, and are finally mixed by a mixer from baseband to the pass band. The mixer modulates the symbols onto a carrier signal at a specific carrier frequency. The transmission filter is used to produce a transmission signal with as narrow a bandwidth as possible.

The resultant transmission signal is sent from the transmitter via a radio channel to the receiver. The radio channel distorts the transmission signal and adds noise to it. In the digital communication system receiver, the signal which has been received via the radio channel is converted by an analogue/digital (A/D) converter to a quantized received signal. The quantized received signal is then down-mixed by a mixer to an intermediate frequency (IF) or to baseband. Once the signal has been down-mixed, it is necessary to ensure that only those signal components which are within the frequency band defined by the signal bandwidth are passed to the further processing stages. This is referred to as channel selection. A reception filter is normally provided for this purpose, which suppresses the undesirable frequency components, and if required together with the transmission filter reduces the intersymbol interference, and maximizes the signal-to-noise ratio.

The received signal is sampled in a sampling device after being filtered, and the symbols in the received signal are associated in a subsequent decision-making device with the symbol which has most probably been transmitted. The symbols are then converted or demodulated again by a mapping device or a demapper, on the basis of the digital modulation method that is used, to form a bit stream.

The optimum demodulation with the minimum bit error rate (BER) is based on the concept of a matched filter. Matched filters are based on the knowledge that the signal-to-noise ratio (SNR) for a radio channel with white Gaussian noise (AWGN=Additive White Gaussian Noise) can be maximized when the impulse response of the reception filter, as a matched filter, is the complex-conduit, time mirror-image impulse response of the transmission filter. Furthermore, the demodulation process must be synchronized, that is to say the carrier frequency and the carrier phase must be known or recovered in the receiver. If the carrier phase is known, this is referred to as coherent demodulation, and if the carrier phase is not known, this is referred to as non-coherent demodulation.

There are various digital modulation methods which are used in digital communication systems. The basic digital modulation methods include amplitude shift keying (ASK), frequency shift keying (FSK) and phase shift keying (PSK). In the case of amplitude shift keying or modulation, the in-phase component of a symbol can assume M different amplitude values and one sampling time. The quadrature component is not used in this case. In the case of phase shift keying or modulation, M states are distinguished, with a different phase angle and the same amplitude. The points on the complex plane of the symbol space thus lie on a circle. In the case of frequency shift keying or modulation, the carrier frequency is changed as a function of the data.

There are numerous sub-variants of the basic digital modulation methods and, for example, these can also be subdivided into modulation methods without any memory and modulation methods with a memory or differential modulation methods. In the case of differential modulation methods, information is transmitted by state transitions rather than by the absolute state. The receiver therefore does not need to know the absolute phase angle and need determine only the phase change between the current symbol and a subsequent symbol. In this case, there is no need to recover the carrier phase exactly, provided that the phase error per symbol resulting from any frequency offset is small. Non-coherent demodulation can therefore be used.

One type of known phase shift keying without any memory is quaternary phase shift keying (QPSK), in which the phases of the states are each shifted through 90° with respect to one another. Known phase shift keying processes with a memory, in contrast, are by way of example DQPSK (Differential Quaternary Phase Shift Keying) and 8-DPSK (Differential Phase Shift Keying). In the case of δ/4-DQPSK, by way of example, two state diagrams that are rotated through 45° are used alternately, in which case the transitions between the states may take place only between the two state diagrams, but not within the same state diagram. Only two bits can therefore be transmitted per symbol in the case of p/4-DQPSK, despite there being eight possible states. One known frequency shift keying process with a memory is GFSK (Gaussian Frequency Shift Keying), in which suitable pulse shaping is carried out in baseband with regard to the instantaneous frequency, by means of Gaussian filters, in order to suppress crosstalk between individual frequency channels. GFSK is a special case of so-called CPFSK (Continuous Phase Frequency Shift Keying). In CPFSK, and in contrast to abrupt frequency shift keying FSK, continuous phase transitions take place between the individual symbols. In the case of CPFSK, only one fundamental frequency is used, and is deliberately mistuned. The phase angle thus remains continuous.

In wire-free digital communication systems such as DECT (Digital Enhanced Cordless Telecommunications), WDCT (Worldwide Digital Cordless Telecommunications) or Bluetooth, suitable receivers are required for wire-free reception of transmitted radio-frequency signals, these being receivers which are suitable for processing of the digital modulation type that is used in the respective communication system. In addition to high sensitivity, it is desirable for the receiver to have a high degree of integration, to cost little, to consume little power and to be flexible in terms of applicability to different digital communication systems.

The wire-free digital communication systems nowadays preferably use GFSK as the digital modulation method. In this two-value modulation method, it is preferable to use a receiver with a limiter or a limiting device instead of a conventional A/D converter. The limiting device converts the received signal to a binary data stream using a simple comparator, with a low intermediate frequency. The limiting device chops off all the input levels above a predetermined level threshold, that is to say it produces an output signal at a constant signal level in the chopped-off area. If the limiting device has high gain and/or a low level threshold, it is operated virtually continuously in the chopped-off area. A discrete-value (binary) signal, which is nevertheless continuous over time, is thus produced just by this means at the output of the limiting device. The useful information in the signal at the outputs of the limiting device is contained in its zero crossings. The rest of the signal processing is carried out digitally. The use of a limiting device is distinguished by low costs and a low power consumption, since there is no need to use a conventional high-resolution analogue/digital (A/D) converter.

The standards for the digital communication systems DECT, WDCT or Bluetooth are currently being developed further towards higher data rates, with digital modulation methods such as DQPSK and 8-DPSK with more values being used. In this case, a root-cosine filter (RRC=Root-Raised Cosine) is preferably used as the transmission filter for signal forming in the transmitter. Investigations have shown that simply adding a limiting device to a conventional receiver for a modulation method with more values leads to a severe loss of performance in comparison to a linear (ideal) receiver. This loss of performance may be quite considerable, particularly when subject to the influence of non-linear effects. Since the standards provide in addition for the capability to switch to the more robust two-value modulation methods, for example when the reception conditions are poor, the terminals have to support both the two-value digital modulation methods, and digital modulation methods with more values.

Since the performance loss that has been mentioned when using a receiver with a limiting device is unacceptable, a receiver with a conventional high-resolution A/D converter is used nowadays for the modulation methods with more values. If the digitization is carried out after quadrature signal production, as is generally the case nowadays, two A/D converters are required, in each case one for the I branch and one for the Q branch of the digital modulation method. If the resolution of an A/D converter is sufficient (for example 10 bits), this makes it possible to achieve approximately the same performance as an ideal receiver.

One disadvantage of the use of conventional high-resolution A/D converters is, however, that the implementation complexity is very high, and this is therefore associated with increased costs and a greater power consumption.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention is directed to a receiver for a digital communication system, whose implementation complexity and power consumption are low, and which is suitable for both two-value digital modulation methods and for digital modulation methods with more values.

One idea on which the present invention is based is to reduce the loss of performance when using a limiting device in a receiver, by means of additional matched filters. The receiver according to one embodiment of the invention is also based on a method for phase reconstruction on the basis of the zero crossings of a received intermediate-frequency signal.

The invention provides a receiver for a wire-free communication system for reception of a received signal which is modulated using a digital modulation method. The receiver includes a first frequency conversion device for production of a frequency-converted received signal by conversion of the received signal to an intermediate frequency, and a pre-filter for production of a filtered received signal from the frequency-converted received signal in such a way that the received signal is band-limited. The receiver further includes an analogue/digital converter for production of a binary received signal from the filtered received signal by comparison of the filtered received signal with a level threshold. In addition, the receiver includes a phase reconstruction device for production of a phase-reconstructed received signal by reproduction of the phase of the received signal from the time intervals between zero crossings of the binary received signal, and a mapping device for production of a bit sequence by mapping symbols from the phase-reconstructed received signal onto this bit sequence using the digital modulation method.

The invention also provides a receiver for a wire-free communication system for reception of a received signal which is modulated using a digital modulation method having a first frequency conversion device for production of a frequency-converted received signal by conversion of the received signal to an intermediate frequency. The receiver also includes a pre-filter for production of a filtered received signal from the frequency-converted received signal in such a way that the received signal is band-limited, and an analogue/digital converter for production of a binary received signal from the filtered received signal by comparison of the filtered received signal with a level threshold. In addition, the receiver comprises a post-filter for production of a filtered binary received signal by filtering of the binary received signal in such a way that higher-frequency interference signals which are produced by the analogue/digital converter are suppressed, and a mapping device for production of a bit sequence by mapping symbols from the filtered binary received signal onto this bit sequence using the digital modulation method.

One advantage of the receiver according to the present invention is that it costs less and consumes less power than a linear receiver.

A further advantage of the receiver according to the invention is that the existing receiver architecture can be upgraded, for example, from suitability for a two-value digital modulation method, without any problems, to suitability for a combination of a two-value digital modulation method and a digital modulation method with more values.

A further advantage of the receiver according to the invention is that it is essentially based on a digital design, with the advantages which result from this in terms of flexibility and integration capability.

A further advantage of the receiver according to the invention is that the performance of the receiver with a limiting device can be considerably improved for modulation methods with more values, by means of matched pre-filtering and post-filtering. The use of a limiting device for these modulation methods therefore represents an attractive embodiment, with the performance loss in comparison to a linear receiver being only minor (e.g., <1 dB).

A further advantage of the receiver according to the invention is that its complexity in terms of analogue circuit components, such as a pre-filter, is kept low, and that it is possible to produce at low cost a combined receiver for two-value digital modulation methods and for digital modulation methods with more values.

A further advantage of the receiver according to the invention is that phase reconstruction allows the considerable performance loss in comparison to a linear receiver to be considerably reduced.

According to one embodiment of the receiver, a phase reconstruction device for production of a phase-reconstructed received signal by reproduction of the phase of the received signal from the time intervals between zero crossings of the binary received signal is arranged between the analogue/digital converter and the post-filter.

According to a further embodiment of the receiver, the pre-filter has a root-cosine characteristic.

According to a further embodiment of the receiver, the pre-filter is an analogue 5th-order Butterworth low-pass filter with a cut-off frequency of 500 kHz.

According to a further embodiment of the receiver, the analogue/digital converter comprises a comparator. One advantage of this embodiment of the invention is that only one comparator and no conventional high-resolution A/D converter is required for the A/D converter, so that a simple implementation is possible.

According to a further embodiment of the receiver, a second frequency conversion device is arranged between the analogue/digital converter and the mapping device for conversion of the binary received signal to baseband.

According to another embodiment of the receiver, the post-filter is a linear-phase low-pass filter with a finite impulse response (FIR), whose cut-off frequency is greater than the symbol rate of the received signal by a factor of 1.5-2 times.

According to yet another embodiment of the receiver, the post-filter comprises an FIR filter with 128 coefficients and a cut-off frequency of $f_g$=1.75 MHz.

According to a further embodiment of the receiver, a sampling device for sampling the binary received signal is arranged between the second frequency conversion device and the mapping device and reduces the sampling rate of the binary received signal to a symbol clock rate of the symbols.

According to still another embodiment of the receiver, the mapping device is followed by a differential detection device for determination of the transmitted bit sequence from the bit sequence of the mapping device using a differential digital modulation method.

According to another embodiment of the receiver, the received signal is a GFSK (Gaussian Frequency Shift Keying), a CPFSK (Continuous Phase Frequency Shift Keying), a PSK (Phase Shift Keying), a DQPSK (Differential Quaternary Phase Shift Keying) or an 8-DPSK signal (Differential Phase Shift Keying).

According to a further embodiment of the receiver, the receiver is used in a wire-free digital communication system.

According to a further embodiment of the receiver, the wire-free digital communication system is a DECT (Digital Enhanced Cordless Telecommunications), a WDCT (Worldwide Digital Cordless Telecommunications) or a Bluetooth communication system.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Exemplary embodiments of the present invention will be explained in more detail in the following text with reference to the attached drawings, in which.

DETAILED DESCRIPTION OF THE INVENTION

Figure 1:
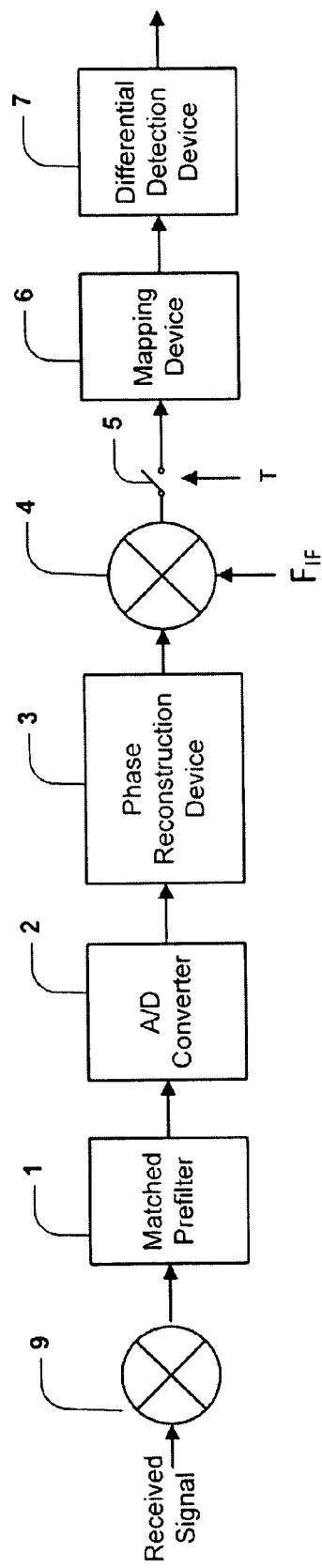
FIG. 1 is a block diagram illustrating a first exemplary embodiment of a receiver according to the invention.

FIG. 1 shows a first exemplary embodiment of a receiver according to the invention, which has a first frequency conversion device 9, a matched pre-filter 1, an analogue/digital converter 2, a phase reconstruction device 3, a second frequency conversion device 4, a sampling device 5, a mapping device 6 and a differential detection device 7. The analogue/digital converter 2 is a limiter or a limiting device followed by a sampler. The frequency conversion device 4 is preferably a mixer.

The pre-filter 1 is used to band-limit a received signal, which is being converted to an intermediate frequency, at a first frequency conversion device 9, and to carry out the channel selection process. The pre-filter 1 reduces the performance loss that has been mentioned for digital modulation methods with more values. The pre-filter 1 preferably has a root-cosine characteristic when the pulse shaping in a transmitter is carried out by means of a root-cosine filter (matched filter). An output signal from the matched filter is preferably sampled at multiples of the symbol duration. Since these times are generally not known to the receiver, for example because of delay time effects on the channel, these times must be estimated by means of a time synchronization process. The position of the constellation points with respect to the synchronization times then corresponds, for example, to an N-PSK constellation.

One output of the pre-filter 1 is connected to one input of the analogue/digital converter 2, which is used to convert an output signal from the pre-filter 1 to a time-continuous binary signal, whose zero crossings contain the information about the phase of the received signal. The analogue/digital converter 2 chops off all input levels above a level threshold, that is to say it produces an output signal at a constant signal level in a chopped-off area. The analogue/digital converter 2 is preferably a comparator with a level threshold and followed by a sampler.

One output of the analogue/digital converter 2 is connected to one input of the phase reconstruction device 3. The phase reconstruction device 3 is used in order to reconstruct the phase of the received signal and/or the phase change by means of digital signal processing methods (see, for example, A. Neubauer, "Irreguläre Abstastung—Signaltheorie und Signalverarbeitung" [Irregular sampling—signal theory and signal processing], Berlin: Springer-Verlag 2003) from the time intervals between the zero crossings of the binary output signal from the analogue/digital converter 2. When using digital signal processing algorithms, an output signal from the phase reconstruction device 3 represents the reconstructed, discrete-time instantaneous phase or instantaneous frequency of the received intermediate-frequency signal. In consequence, the performance reduction that has been mentioned for digital modulation methods with more values is reduced. This is dependent on the sampling rate of the sampler for the analogue/digital converter 2 being chosen to be considerably greater than the intermediate frequency. The sampling rate is preferably greater than the intermediate frequency, for example, by a factor of 16.

One output of the phase reconstruction device 3 is connected to one input of a second frequency conversion device 4. The second frequency conversion device 4 converts the output signal from the phase reconstruction device 3 from intermediate frequency to baseband. One output of the second frequency conversion device 4 is connected to one input of the sampling device 5. The sampling device 5 reduces the sampling rate of an output signal from the second frequency conversion device 4 to the symbol clock rate. One output of the sampling device 5 is connected to one input of the mapping device 6. The mapping device 6 detects (in accordance with the digital modulation method that is used in the transmitter and in the receiver) the symbols in an output signal from the sampling device 5, and it demodulates them to form a bit stream. One output of the mapping device 6 is connected to one input of the differential detection device 7. The differential detection device 7 uses the bit stream from the mapping device 6 to determine the transmitted data bits, when a differential digital modulation method has been used to transmit the data bits. The transmitted symbols or bit sequences define the phase differences for DMPSK such as DQPSK or D8PSK. If the phase differences are estimated in the receiver, then they can be mapped onto the associated bit stream on the basis of the modulation method, which is known in the receiver.

In the above exemplary embodiment and in the following exemplary embodiments, the received signal is preferably a complex DQPSK-modulated signal or an 8-DPSK-modulated signal, with an I component and a Q component, and the receiver is preferably a DQPSK or DPSK receiver. In the case of a DQPSK-modulated signal, the pulse shaping in the transmitter is preferably carried out by means of a root-cosine filter (RRC=Root Raised Cosine). The receiver parameters are preferably chosen in accordance with the Bluetooth specification for data rates of 2 Mbit/s. An analogue 5th-order Butterworth low-pass filter with a cut-off frequency of 500 kHz is then preferably used as the matched pre-filter 1 and provides a very good approximation to the RRC characteristic of the root-cosine filter in the transmitter. Alternatively, a transmit filter with a finite impulse response (FIR Transmit Filter) and with a filter length of 5 symbols or a Chebyshev filter with a cut-off frequency of $f_g$=700 kHz is used as the matched pre-filter 1.

The matched pre-filter 1 leads to a considerable improvement in the phase reconstruction in the phase reconstruction device 3. The corresponding constellation points on a constellation diagram are considerably closer to, for example, the 8-PSK constellation, despite the non-ideal matched pre-filter 1. The signal-to-noise ratios for white noise with a Gaussian distribution (AWGN=Additive White Gaussian Noise) have permanent power losses, in comparison to a linear receiver, with a bit error rate of $10^{-4}$ which are only 0.5-0.6 dB, and are a result of the non-ideal pre-filter.

Figure 2:
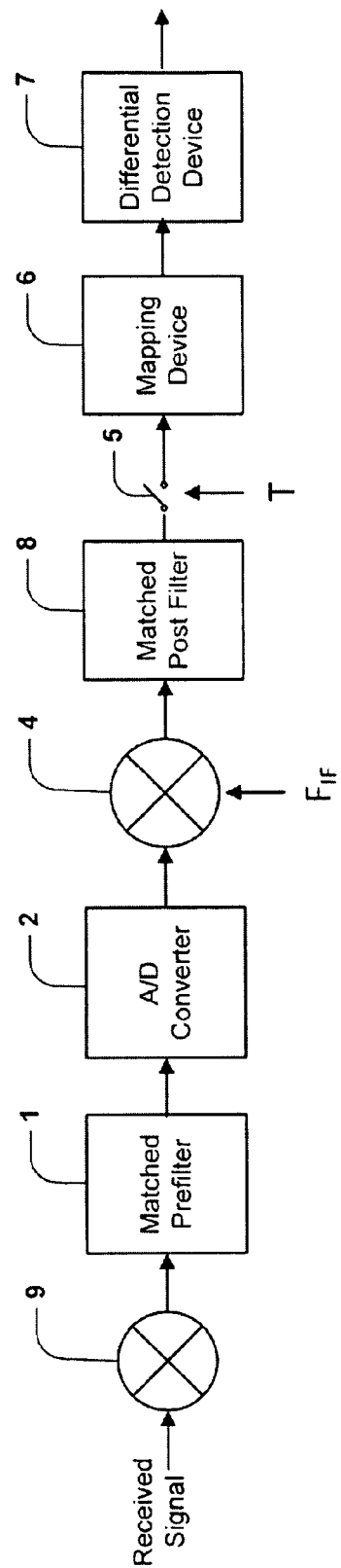
FIG. 2 is a block diagram illustrating a second exemplary embodiment of a receiver according to the invention.

FIG. 2 shows a second exemplary embodiment of a receiver according to the invention. In comparison to the receiver shown in FIG. 1, this receiver has a matched post-filter 8 instead of the phase reconstruction device 3, and this post-filter 8 is arranged between the second frequency conversion device 4 and the sampling device 5. One input of the matched post-filter 8 is connected to the output of the second frequency conversion device 4. The matched post-filter 8 is used in order to carry out low-pass filtering of the output signal from the second frequency conversion device 4, taking account of the useful signal form. The cut-off frequency of the matched post-filter 8 is in general chosen such that the useful signal is passed through without being interfered with, and higher-frequency interference components which are produced, for example, by the analogue/digital converter 2 are adequately attenuated.

An optimized, linear-phase FIR low-pass filter is preferably used as the matched post-filter 8 for matched filtering and for suppression of the higher-frequency interference, and its cut-off frequency is greater than the symbol rate of the received signal by a factor of 1.5-2 times, in particular using a filter with a finite impulse response (FIR filter) with, for example, 128 coefficients and a cut-off frequency of $f_g$=1.75 MHz. The signal-to-noise ratio when using a 5th-order Butterworth low-pass filter as the pre-filter with a bit error rate of $10^{-4}$ is only about 0.8 dB worse than when using a linear receiver, so that there is no longer any need for phase reconstruction with optimized pre-filters and post-filters.

Figure 3:
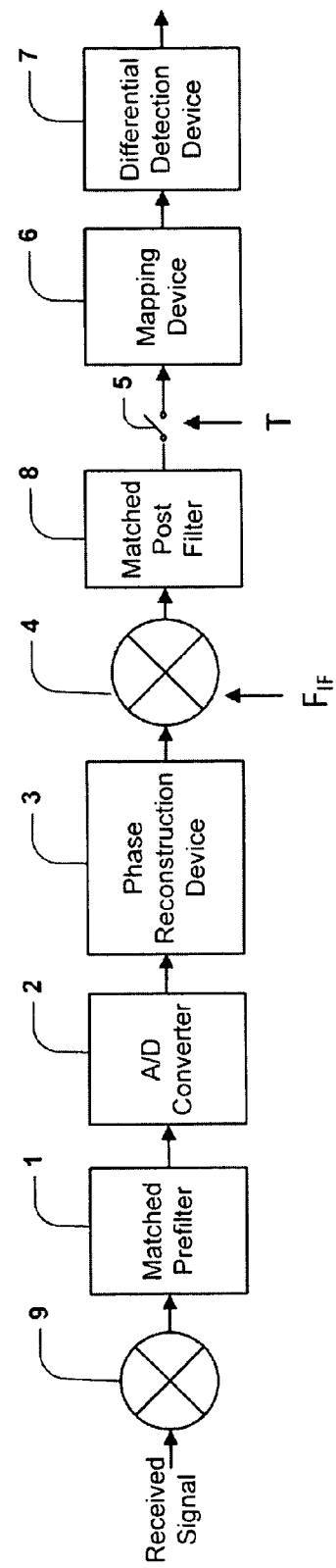
FIG. 3 is a block diagram illustrating a third exemplary embodiment of a receiver according to the invention.

FIG. 3 shows a third exemplary embodiment of a receiver according to the invention. In this exemplary embodiment, both a phase reconstruction device 3 and a matched filter 8 are provided, with the latter being arranged between the second frequency conversion device 4 and the step-down sampling device 5.

The performance loss, in terms of the signal-to-noise ratio, in the receiver according to the invention with an analogue/digital converter 2 is more than 2 dB in comparison to the linear receiver for a bit error rate of $10^{-4}$. The additional phase reconstruction device 3 reduces the losses to about 1 dB.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A receiver for a wire-free communication system for reception of a received signal which is modulated using a digital modulation method, comprising:
   a first frequency conversion device configured to produce a frequency-converted received signal by conversion of the received signal to an intermediate frequency;
   a pre-filter configured to produce a filtered received signal from the frequency-converted received signal such that the received signal is band-limited;
   an analogue/digital converter configured to produce a binary received signal from the filtered frequency-converted received signal by comparison of the filtered received signal with a level threshold;
   a phase reconstruction device configured to produce a phase-reconstructed received signal by reproduction of the phase of the received signal from the time intervals between zero crossings of the binary received signal;
   a mapping device configured to produce a bit sequence by mapping symbols from the phase-reconstructed received signal onto the bit sequence using the digital modulation; and
   a second frequency conversion device arranged between the analogue/digital converter and the mapping device, and configured to convert the binary received signal to baseband.

2. The receiver of claim 1, wherein the pre-filter comprises a root-cosine filter characteristic.

3. The receiver of claim 1, wherein the pre-filter comprises an analogue 5th-order Butterworth low-pass filter with a cut-off frequency of 500 kHz.

4. The receiver of claim 1, wherein the analogue/digital converter comprises a comparator.

5. The receiver of claim 1, further comprising a sampling device configured to sample the binary received signal, and arranged between the second frequency conversion device and the mapping device, and configured to reduce the sampling rate of the binary received signal to a symbol clock rate of the symbols.

6. The receiver of claim 1 further comprising a differential detection device downstream of the mapping device, and configured to determine the transmitted bit sequence from the bit sequence of the mapping device using a differential digital modulation method.

7. A receiver for a wire-free communication system for reception of a received signal which is modulated using a digital modulation method, comprising:
   a first frequency conversion device configured to produce a frequency-converted received signal by conversion of the received signal to an intermediate frequency;
   a pre-filter configured to produce a filtered received signal from the frequency-converted received signal such that the received signal is band-limited;
   an analogue/digital converter configured to produce a binary received signal from the filtered received signal by comparison of the filtered received signal with a level threshold;
   a post-filter configured to produce a filtered binary received signal by filtering of the binary received signal such that higher-frequency interference signals associated therewith are suppressed;
   a mapping device configured to produce a bit sequence by mapping symbols from the filtered binary received signal onto the bit sequence using the digital modulation method; and
   a phase reconstruction device configured to produce a phase-reconstructed received signal by reproduction of the phase of the received signal from the time intervals between zero crossings of the binary received signal, and wherein the phase reconstruction device is arranged between the analogue/digital converter and the post-filter; and
   a second frequency conversion device arranged between the analogue/digital converter and the mapping device, and configured to convert the binary received signal to baseband.

8. The receiver of claim 7, wherein the pre-filter comprises a root-cosine filter characteristic.

9. The receiver of claim 7, wherein the pre-filter comprises an analogue 5th-order Butterworth low-pass filter with a cut-off frequency of 500 kHz.

10. The receiver of claim 7, wherein the analogue/digital converter comprises a comparator.

11. The receiver of claim 7, wherein the post-filter comprises a linear-phase low-pass filter with a finite impulse response having a cut-off frequency greater than a symbol rate of the received signal by a factor of about 1.5-2 times.

12. The receiver of claim 11, wherein the post-filter comprises a finite impulse response filter with 128 coefficients and a cut-off frequency of $f_g=1.75$ MHz.

13. The receiver of claim 7, further comprising a sampling device configured to sample the binary received signal, and arranged between the second frequency conversion device and the mapping device, and configured to reduce the sampling rate of the binary received signal to a symbol clock rate of the symbols.

14. The receiver of claim 7, further comprising a differential detection device downstream of the mapping device, and configured to determine the transmitted bit sequence from the bit sequence of the mapping device using a differential digital modulation method.

15. The receiver of claim 7, wherein the received signal is a GFSK (Gaussian Frequency Shift Keying), a CPFSK (Continuous Phase Frequency Shift Keying), a PSK (Phase Shift Keying), a DQPSK (Differential Quaternary Phase Shift Keying) or an 8-DPSK signal (Differential Phase Shift Keying).

* * * * *